United States Patent [19]
Nishida et al.

[11] Patent Number: 5,282,070
[45] Date of Patent: Jan. 25, 1994

[54] LIQUID CRYSTAL DEVICE WITH SEPARATE APERATURE MASKS AND CONDUCTOR BLOCKING SEPARATIONS

[75] Inventors: Naoya Nishida, Hadano; Kazuya Ishiwata, Yokosuka; Tatsuo Murata, Hiratsuka, all of Japan

[73] Assignee: Canon Kabushiki Kaisha, Tokyo, Japan

[21] Appl. No.: 965,867

[22] Filed: Oct. 23, 1992

[30] Foreign Application Priority Data

Oct. 25, 1991 [JP] Japan .................. 3-305609

[51] Int. Cl.⁵ .................. G02F 1/1335; G02F 1/1343
[52] U.S. Cl. ........................ 359/67; 359/87; 359/68
[58] Field of Search ............ 359/54, 67, 68, 87

[56] References Cited

U.S. PATENT DOCUMENTS

| | | | |
|---|---|---|---|
| 4,367,924 | 1/1983 | Clark et al. | 359/56 |
| 4,632,516 | 12/1986 | Ishiwata | 359/268 |
| 4,712,874 | 12/1987 | Sekimura et al. | 359/68 |
| 4,786,148 | 11/1988 | Sekimura et al. | 359/68 |
| 4,802,743 | 2/1989 | Takao et al. | 359/68 |
| 4,818,075 | 4/1989 | Takao et al. | 359/68 |
| 4,824,213 | 4/1989 | Morokawa | 359/54 |
| 4,850,681 | 6/1989 | Yamanobe et al. | 359/84 |
| 4,878,742 | 11/1989 | Ohkubo et al. | 359/75 |
| 4,917,471 | 4/1990 | Takao et al. | 359/68 |
| 5,000,545 | 5/1991 | Yoshioka et al. | 359/87 |
| 5,045,418 | 9/1991 | Fukuyashi | 359/68 |
| 5,078,475 | 1/1992 | Sekimura et al. | 359/68 |
| 5,101,289 | 3/1992 | Takao et al. | 359/68 |
| 5,124,826 | 6/1992 | Yoshioka et al. | |
| 5,126,867 | 6/1992 | Ishiwata | 359/75 |
| 5,150,233 | 9/1992 | Enomoto et al. | 359/54 |
| 5,161,043 | 11/1992 | Narutaki et al. | 359/54 |

FOREIGN PATENT DOCUMENTS

| | | |
|---|---|---|
| 653 | 1/1978 | Japan . |
| 120470 | 7/1982 | Japan . |
| 120287 | 7/1983 | Japan . |
| 0089932 | 4/1987 | Japan . |

*Primary Examiner*—William L. Sikes
*Assistant Examiner*—Kenneth Parker
*Attorney, Agent, or Firm*—Fitzpatrick, Cella, Harper & Scinto

[57] ABSTRACT

A liquid crystal device with little crosstalk and improved contrast is obtained by using an electrode plate including a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film. The second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe at a separating position, which is covered by the first metal film.

12 Claims, 4 Drawing Sheets

LIQUID CRYSTAL DEVICE WITH SEPARATE APERATURE MASKS AND CONDUCTOR BLOCKING SEPARATIONS

FIELD OF THE INVENTION AND RELATED ART

The present invention relates to an electrode plate and a liquid crystal device using the same, particularly an electrode plate suitable for a display apparatus using a ferroelectric liquid crystal and a liquid crystal device using the electrode plate.

Hitherto, a liquid crystal display apparatus of a simple matrix-type has not conventionally used a light-shielding masking part between pixels regardless of whether it is of the reflection type or the transmission type. In recent years, however, it has been proposed to form a masking part between pixels in order to provide a higher resolution and an improved display quality. For example, Japanese Patent Publication (JP-B) 63-38689 has proposed disposing metal electrodes as auxiliary electrodes for, e.g., conductivity enhancement, in the form of a ladder on transparent electrodes for display on one substrate so as to mask a spacing between pixels on the counter substrate. As for electrode plate provided with a color filter, JP-B 53-653 has proposed to dispose color filters between masking parts, and JP-B 2-1311 has proposed to dispose an opaque film along a boundary between color filters and dispose a transparent film thereon.

Over the metal masking parts, there is formed an insulating layer, examples of which may include films of inorganic materials inclusive of oxides, such as $SiO_2$, $Ta_2O_5$, and $Al_2O_3$; and organic materials such as polyimide, polyamide and organo-metal oxides.

Further, a color filter, etc. formed over the metal masking parts may also be considered as a type of insulating film. Such a color filter may be formed as a combination of plural patterned color resin films formed by repeating formation of a colored resin film comprising a photosensitive resin containing a colorant dispersed therein and lithographic patterning steps. In a type of such a color filter, the colorant is contained in an increasing density from the surface portion to the bottom portion of the colored resin film.

As conventional liquid crystal devices, there have been known ones using a twisted nematic liquid crystal. This type of liquid crystal devices has involved a problem that the number of pixels is restricted due to occurrence of crosstalk when pixels arranged at a high density are driven by using a matrix electrode structure according to a multiplex driving scheme.

There has been also known a type of liquid crystal device where each pixel is provided with a switching element comprising a thin film transistor for switching pixel by pixel. This type of device involves a problem that it requires a very troublesome step of forming thin film transistors on a substrate, so that it is difficult to prepare a large area display device.

In order to solve these problems, Clark et al have proposed a ferroelectric liquid crystal device in U.S. Pat. No. 4,367,924.

FIG. 5 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide). etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., 0.1-3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 6, thus providing a bistable condition. When an electric field Ea or Eb higher than a certain threshold level and different from each other in polarity as shown in FIG. 6 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 6. When the electric field Ea is applied to the liquid crystal molecules, they are oriented in the first stable state 33a. This state is stably retained eve if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

In order for such a ferroelectric liquid crystal device to show prescribed driving characteristics, the ferroelectric liquid crystal disposed between a pair of substrates is required to be placed in such an alignment state as the cause an effective switching between the above-mentioned two stable states regardless of whether or not it is placed under an electric field. For example, as for a ferroelectric liquid crystal in chiral smectic phase, there should be formed a monodomain wherein liquid crystal molecular layers in the chiral smectic phase should be disposed roughly perpendicularly to the substrate and correspondingly liquid crystal molecular axes are disposed in roughly parallel with the substrate faces.

In a panel using such a liquid crystal, it is preferred to dispose masking parts or layers between pixels. Such a masking layer may for example be formed by disposing a photosensitive colored resin layer as by spin coating and patterning the layer by a sequence of disposing an oxygen-shielding film, exposure and development.

On the other, it is also possible to form a metal masking film in order to improve the contrast.

However, as for such methods of disposing masking portions between pixels, the above-mentioned method of disposing metal electrodes as auxiliary electrodes in the form a ladder causes a difficulty, such as disorder of liquid crystal alignment at parts surrounded by the metal electrodes, e.g., when it is applied to a ferroelectric liquid crystal.

In order to obviate such a difficulty, it is also known to dispose a light-shielding mask directly onto a substrate, such as a glass plate and then covering the mask with an insulating layer as described above. In this type of structure, it is usual to dispose the mask at all parts except for effective display regions in view of the intended purpose of light shielding. However, in case where a light-shielding mask of a metal material is disposed at all the part except for display regions, the inner surface of the substrate is electrically connected with the metal material, so that there is liable to be encountered with a difficulty that effective elements are short-circuited with each other unless the insulating film formed on the light-shielding mask is perfect.

For example, in case where such a metal light-shielding mask is disposed over a certain area on a glass substrate so as to leave apertures in the form of windows at parts corresponding to display regions, an insulating film is formed thereon and then display electrodes and auxiliary electrodes are formed thereon, it is assumed that electrically conductive foreign matter is commingled into the insulating layer to cause a defect that the lowermost light-shielding mask and, e.g., the auxiliary electrode are electrically conducted. If such a defect occurs at one part or plural parts on a single information electrode forming a simple matrix electrode structure, the defect would not be so serious but, if such defect occurs at plural remote parts to cause an electrical continuity therebetween, there occurs a misoperation or crosstalk that a single for displaying at a pixel is also sent via the metal mask to another pixel to drive the pixel.

Further, there is also encountered a difficulty that a color filter formed on a metal mask of Mo is liable to be peeled off because of poor adhesion during the production process.

SUMMARY OF THE INVENTION

In view of the above-mentioned difficulties of the prior art, an object of the present invention is to provide an electrode plate and a liquid crystal device using the electrode plate wherein a metal-shielding mask is separated for each pixel to prevent a short circuit from other pixels and the separation parts are disposed below metal auxiliary electrodes so as to prevent occurrence of parts causing masking failure, thus preventing decrease in contrast or display quality due to leakage light.

Another object of the present invention is to provide an electrode plate for color display having solved the above-mentioned difficulty and a liquid crystal device for color display using the electrode plate.

According to the present invention, there is provided an electrode plate, comprising: a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe at a separating position, which is covered by the first metal film.

The spacing between a pair of adjacent conductor stripes may be covered by the masking parts disposed along one of the pair of adjacent conductor stripes. For providing an electrode plate for color display, a color filter comprising a plurality of color filter segments may be disposed to cover the plurality of discrete masking parts so that each color filter segment corresponds to one of the apertures. A liquid crystal device may be composed by sandwiching a liquid crystal between a pair of electrode plates, one of which is constituted as above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, some embodiments of the present invention will be described with reference to the drawings.

Figure 1A:
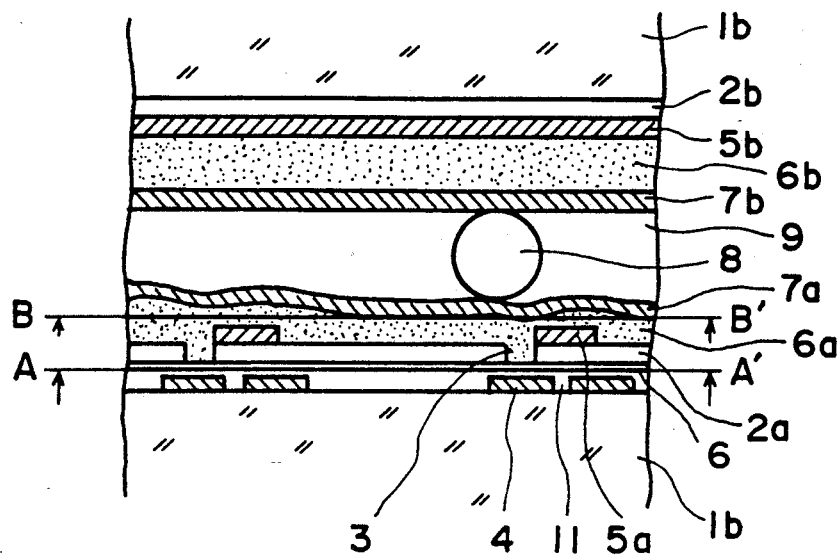
FIGS. 1A and 1B are a partial sectional view and a partial plan view, respectively, of a liquid crystal device according to the invention.

FIG. 1A is a partial sectional view of a first embodiment of the liquid crystal device according to the present invention. These figures show a liquid crystal device including an electrode plate which includes a metal shielding mask comprising metal masking parts each forming a closed pattern and separated for each pixel along with simple matrix electrodes.

Referring to the figures, the electrode plates includes a pair of substrates 1a and 1b carrying common electrodes 2a and data electrodes 2b, respectively. The common electrodes 2a are separated from each other with a spacing 3 and each carries a metal auxiliary electrode 5a along its left side. Below the common electrodes 2a are disposed metal masking parts 4 each disposed in a closed pattern for a pixel and separated from each other with a spacing 11 by the medium of an insulating layer 6. Insulating layers 6a and 6b are disposed on the common electrodes 2a and data electrodes 2b, respectively, and alignment films 7a and 7b are further disposed thereon and separated from each other with a spacer 8 to form a cell gap, which is filled with a liquid crystal.

In a specific example, such a liquid crystal device was formed in the following manner. A transparent substrate 1a of, e.g., glass was coated with a 1000 Å-thick layer of molybdenum as a metal masking material by sputtering, which was then patterned through photolithographic steps. On the molybdenum masking parts 4 thus formed, an about 1000 Å-thick insulating film of $SiO_2$ was formed by sputtering. If the $SiO_2$ film is too thin, it shows a poor adhesion with molybdenum, so that it is preferred to provide a thickness of at least 500 Å.

Then, a 1500 Å-thick transparent ITO electrode film was formed and patterned by etching to form a spacing 3 between pixels and leave common electrodes 2a, on which metal molybdenum electrodes 5 were formed by sputtering and patterning.

Then, a 500 Å-thick $SiO_2$ film was formed by sputtering as an insulating layer 6a for preventing short circuit between the substrates, and a 100 Å-thick alignment film 7 was formed thereon.

On a counter substrate 1b, data electrodes 2b, metal auxiliary electrodes 5b, an insulating layer 6b and an alignment film 6b were formed in a similar manner as on the substrate 1a except for omission of the metal masking parts 4 and the insulating layer 6.

Then, the two electrode plats thus obtained were applied with each other with $SiO_2$ bead spacers 8 having an average particle size of 1.5 μm disposed therebetween to form a blank cell, which was then filled with a ferroelectric liquid crystal 9 showing ferroelectricity in its chiral smectic C phase.

Figure 1B:
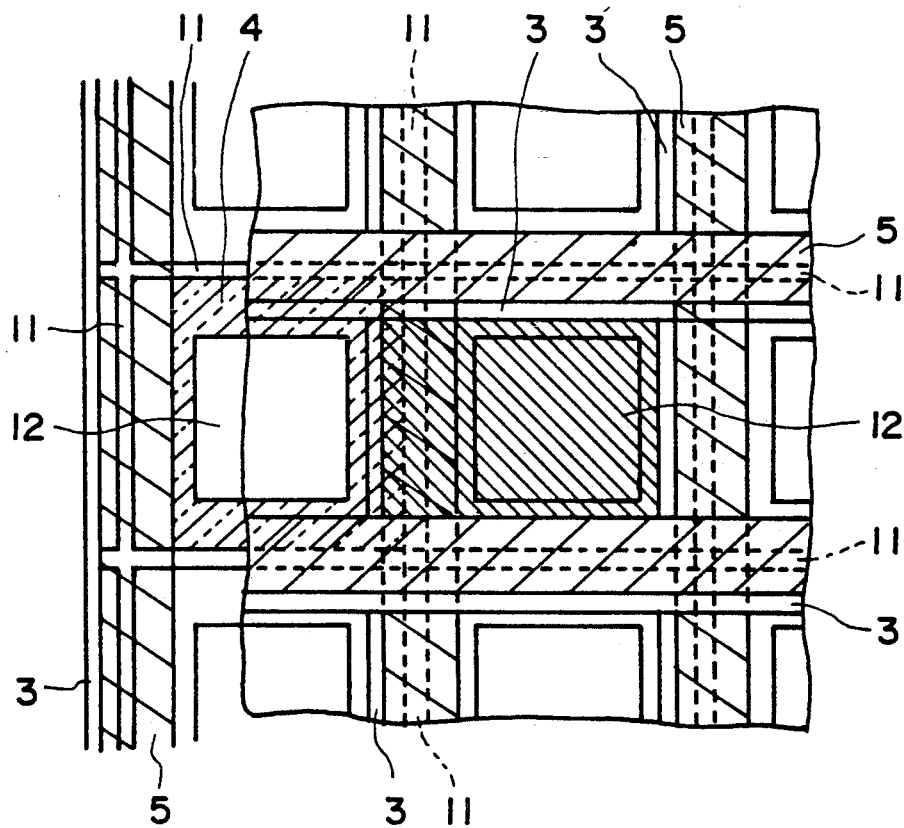

FIG. 1B is a partial plan view of a liquid crystal device according to the present invention, wherein apertures 12 corresponding to pixels two-dimensionally along plural rows and plural columns.

Spacings 3 between the respective pixels (apertures 12) are covered with closed frame-like metal masking parts 4. At the same time, separating parts 11 between the respective metal masking parts 4 are disposed below the metal auxiliary electrodes 5.

In the liquid crystal device thus formed, the spacings 3 between the pixels are covered by the metal masking parts 4, and the separating parts 11 between the metal masking pars 4 are disposed below the metal auxiliary electrodes. As a result, the device provides a high contrast and a good black display state without leakage light through the spacings 3 between the pixels and the mask separating parts 11. Further, the device can be produced with little risk of short circuit between pixels.

Figure 2A:
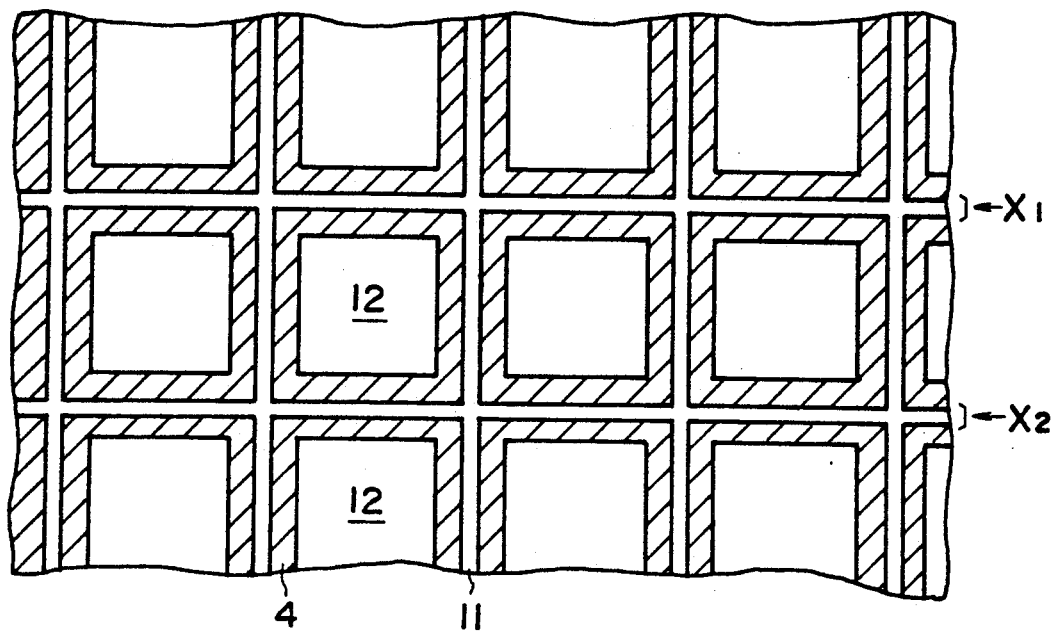
FIG. 2A is a sectional plan view taken along a line A—A' in FIG. 1A.
Figure 2B:
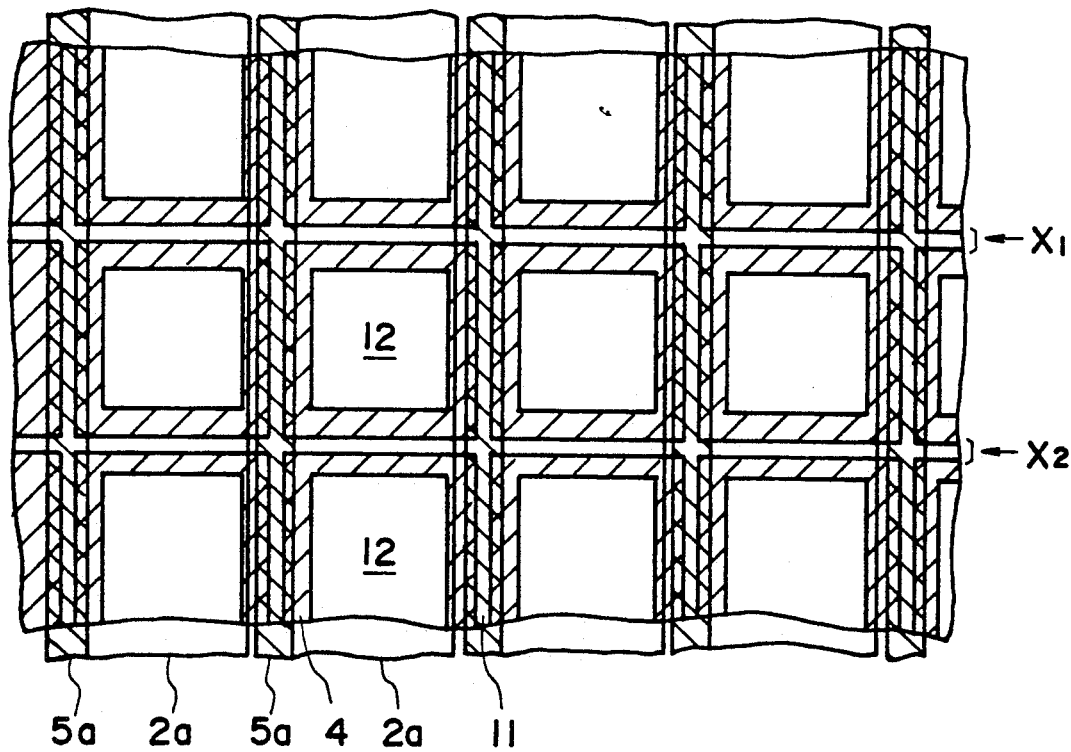
FIG. 2B is a sectional plan view taken along a line B—B, in FIG. 1A.

FIGS. 2A and 2B are partial sectional plan views taken along the lines A—A' and B—B', respectively, in FIG. 1A.

Figure 3:
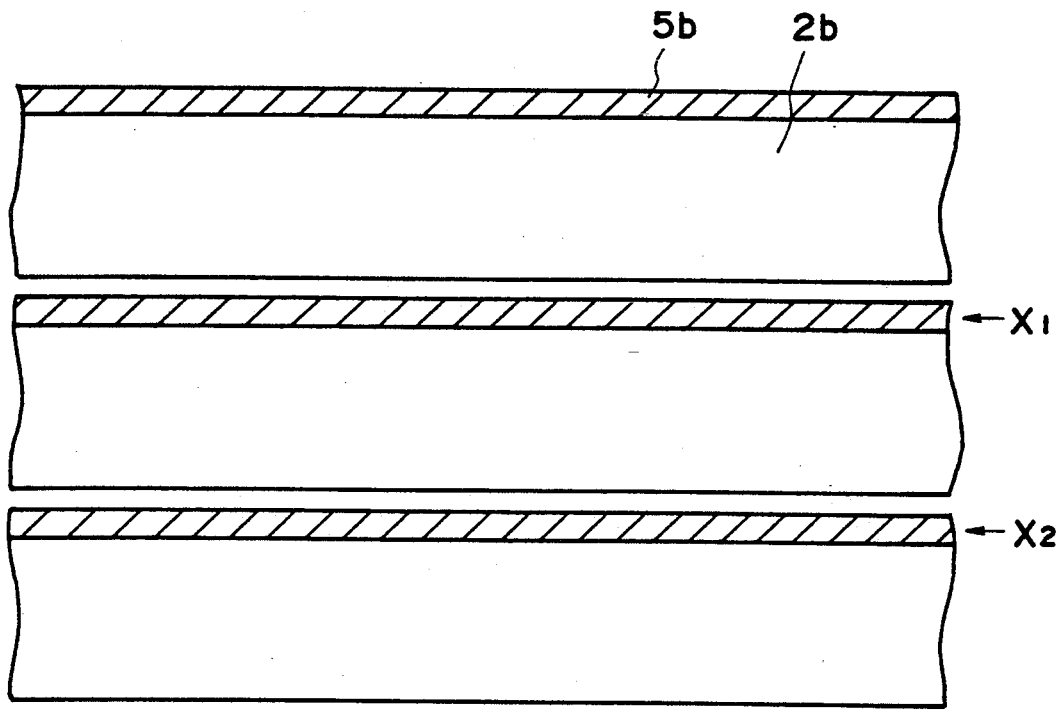
FIG. 3 is a plan view of an electrode plate carrying data electrodes.

FIG. 3 is as plan view of an electrode plate including a substrate 1b having thereon the data electrodes 2b and the metal auxiliary electrodes 5b. When the substrates 1a and 1b are superposed with each other, they are aligned with each other so that the metal auxiliary electrodes 5b also functioning as light-shielding masks formed on the substrate 1b extend perpendicularly to the common electrodes 2a (in parallel with the data electrodes 2b) and cover spacings $X_1, X_2$ . . . formed between vertically adjacent frame-like metal masking parts 4 among all the separating parts between the masking parts 4 formed on the substrate 1a as is understood in view of FIGS. 2A and 3 in parallel.

As is shown in FIG. 2B, the metal auxiliary electrodes 5a formed on the substrate 1a also function as light-shielding masks, so that the separation parts 11 extending in parallel with the common electrodes 2a are masked by the metal auxiliary electrodes 5a.

Figure 4:
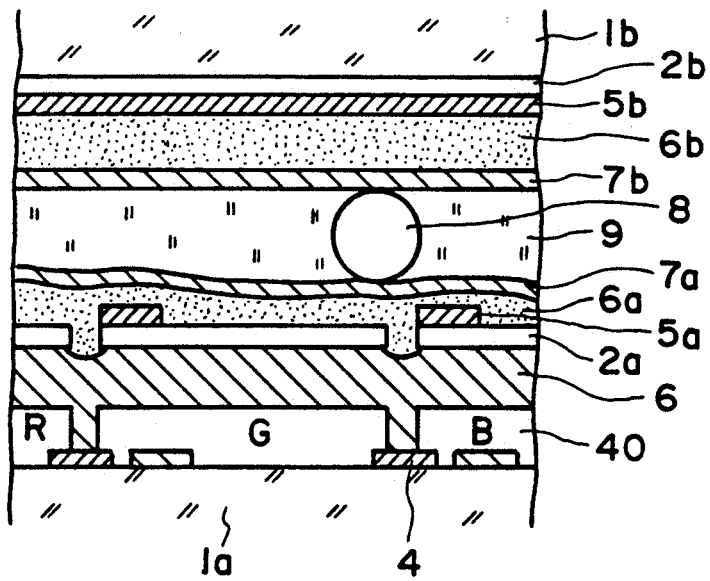
FIG. 4 is a partial plan view of another liquid crystal device for color display according to the present invention.
Figure 5:
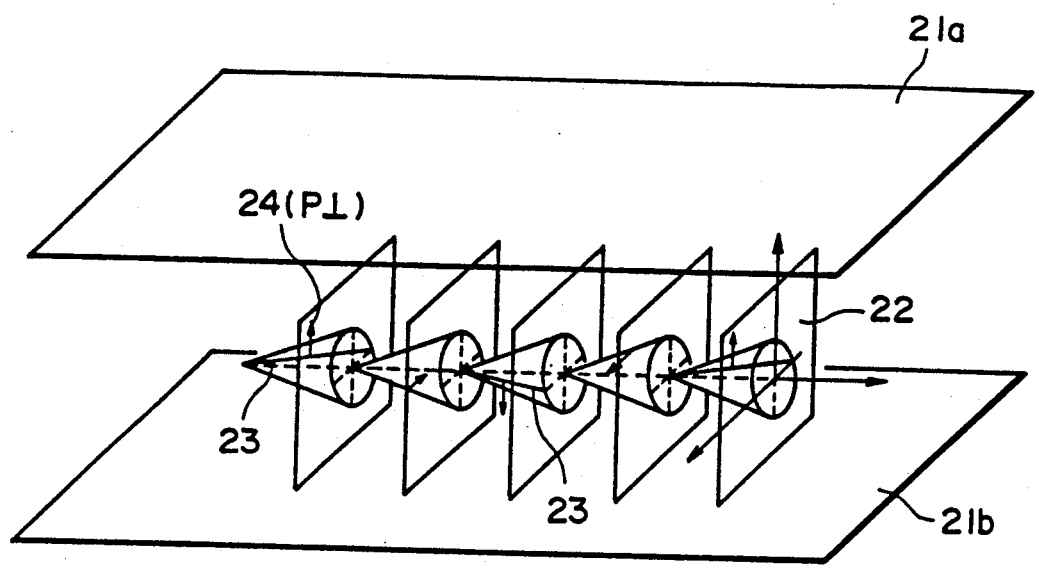
FIGS. 5 and 6 are respectively an illustration for explaining an operation of a ferroelectric liquid crystal device.
Figure 6:
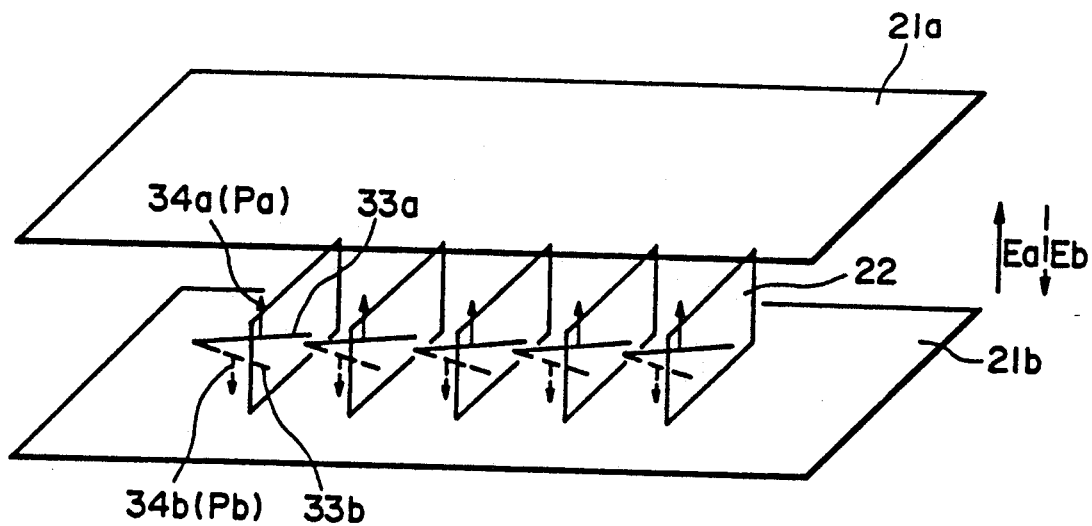

FIG. 4 shows a section of another embodiment of the liquid crystal device according to the present invention, which includes a color filter.

The liquid crystal device shown in FIG. 4 includes an electrode plate for color display which includes a color filter 40 including R, G and B segments on a substrate 1a which also carries metal masking parts 4, an insulating layer 6 common electrodes 2, metal auxiliary electrodes 5a, an insulating layer 6a and an alignment film 7 similarly as in the embodiment shown in FIGS. 1–3. In FIG. 4, the parts denoted by the same reference numerals are the same as those shown in FIGS. 1-3.

In a particular example according to this embodiment, a 1.1 mm-thick blue glass substrate 1a was provided with 1000 Å-thick Cr metal masking parts 4, a 1.6 μm-thick polyamide-type color filter including R, G and B segments containing pigments of respective colors, a polyamide insulating film 6, 1500 Å-thick ITO electrodes as common electrodes 2a, 1500 Å-thick molybdenum metal auxiliary electrodes 5a, a 1500 Å-thick insulating film 6a of an application-type insulating Ti:Si (1:1), and a 200 Å-thick polyimide alignment film 7 otherwise in a similar manner as in the previous example. The thus prepared electrode plate and a counter electrode plate prepared in a similar manner as in the previous example except that the insulating film 6b was the same as the above insulating film 6a, were superposed with each other with $SiO_2$ bead spacers 8 having an average particle size of 1.3 μm in an alignment as explained in the previous embodiment to form a black cell, which was then filled with a ferroelectric liquid crystal 9 showing ferroelectricity in the chiral smectic C phase.

In the liquid crystal device thus prepared, the metal masking parts 4 were separated from each other in a frame-like completely closed pattern and were formed of Cr. As a result, the masking parts showed a good adhesion with the polyamide-base color filter to prevent occurrence of defects due to peeling during the production. Further, an improved contrast was attained by the masking effect, and the occurrence of defects due to short circuit between plural pixels was prevented as a result of separated masking parts, whereby a liquid crystal device having very excellent quality was attained.

In the present invention, the insulating film disposed between the metal or metal oxide masking parts and the transparent electrodes may comprise a color filter and/or a protective film of the color filter. The color filter may preferably comprise a colored resin formed from a photosensitive resin containing at least a colorant dispersed therein.

The metal or metal oxide masking parts may preferably comprise chromium and/or chromium oxide.

The liquid crystal device according to the present invention may preferably be composed as a ferroelectric liquid crystal device using a ferroelectric liquid crystal as the liquid crystal.

The metal masking parts used in the present invention comprise a metal or metal oxide material masking (light-shielding) the spacings between the display pixels formed on a substrate and covered with an insulating layer, on which are further disposed display electrodes, such as common electrodes or data electrodes, and metal auxiliary electrodes. Further, the metal masking parts are separated for each pixel and each masking part is formed in a completely closed pattern. As a result, even if the insulating layer on the metal masking parts is contaminated with electroconductive foreign matter to result in a defect of electrical continuity between the metal auxiliary electrodes and the metal masking parts, such defects are isolated from each other for the respective pixels so that short circuit with other pixels can be prevented. Further, peeling of a color filter, when used, is prevented. If the separation of the metal masking parts is effected at an arbitrary part, some parts causing a masking failure appear but, in the present invention, the separating parts of the metal masking parts are disposed below the metal auxiliary electrodes (for the common and data electrodes). Further, by composing the metal masking parts with chromium, optionally coated with chromium oxide, peeling of a color filter disposed thereon can be prevented.

As described above, according to the present invention, metal masking parts are separated from each other for respective pixels and are respectively formed in a completely closed pattern like a frame. As a result, even if plural pieces of conductive foreign matter are commingled into an insulating layer on the metal masking parts to cause electrical continuity with display electrodes or metal auxiliary electrodes disposed thereabove, almost no short circuit is caused with other pixels.

Further, by disposing the separating positions of the metal masking parts below the metal auxiliary electrodes, it is possible to prevent the occurrence of light-shielding failure so as to prevent a lowering in contrast or display quality due to leakage light.

Further, by disposing metal masking parts separated from each other for respective pixels in a closed pattern and composing the metal masking parts of chromium and/or chromium oxide, an improved adhesion of a color filter formed thereon is attained, thus preventing peeling of the color filter therefrom.

What is claimed is:

1. An electrode plate, comprising: a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe by a separation which is covered by the first metal film.

2. An electrode plate, comprising: a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, the masking parts disposed along one conductor stripe are separated from masking parts disposed along an adjacent conductor stripe by a separation which is covered by the first metal film, and a spacing between said one conductor stripe and said adjacent conductor stripe is covered by the masking parts disposed along said adjacent conductor stripe.

3. An electrode plate, comprising: a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe by a separation which is covered by the first metal film; and a color filter comprising a plurality of segments is disposed to cover the plurality of masking parts so that each segment corresponds to one of the apertures.

4. An electrode plate, comprising: a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; the plurality of discrete masking parts are disposed so that plural masking parts among them are disposed along one conductor stripe so as to form plural apertures along the transparent region of the conductor stripe, the masking parts disposed along one conductor stripe are separated from masking parts disposed along an adjacent conductor stripe by a separation which is covered by the first metal film, and a spacing between said one conductor stripe and said adjacent conductor stripe is covered by the masking parts disposed along said adjacent conductor stripe; and a color filter comprising a plurality of segments is disposed to cover the plurality of masking parts so that each segment corresponds to one of the apertures.

5. A liquid crystal device, comprising: a pair of electrode plates, and a liquid crystal disposed between the electrode plates;

wherein one of the electrode plates comprises a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe by a separation which is covered by the first metal film.

6. A liquid crystal device according to claim 5, wherein said liquid crystal is a ferroelectric liquid crystal.

7. A liquid crystal device, comprising: a pair of electrode plates, and a liquid crystal disposed between the electrode plates;

wherein one of the electrode plates comprises a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; and the plurality of discrete masking parts are disposed so that plural masking parts among them are disposed along one conductor stripe so as to form plural apertures along the transparent region of the conductor stripe, the masking parts disposed along one conductor stripe are separated from masking parts disposed along an adjacent conductor stripe by a separation which is covered by the first metal film, and a spacing between said one conductor stripe and said adjacent conductor stripe is covered by the masking parts disposed along said adjacent conductor stripe.

8. A liquid crystal device according to claim 7, wherein said liquid crystal is a ferroelectric liquid crystal.

9. A liquid crystal device, comprising: a pair of electrode plates, and a liquid crystal disposed between the electrode plates;

wherein one of the electrode plates comprises a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; the plurality of discrete masking parts are disposed so that plural masking parts among them are disposed along one conductor stripe so as to form plural apertures along the transparent region of the conductor stripe, and the masking parts disposed along one conductor stripe are separated from masking parts disposed along an adjacent conductor stripe by a separation which is covered by the first metal film; and a color filter comprising a plurality of segments is disposed to cover the plurality of masking parts so that each segment corresponds to one of the apertures.

10. A liquid crystal device according to claim 9, wherein said liquid crystal is a ferroelectric liquid crystal.

11. A liquid crystal device, comprising: a pair of electrode plates, and a liquid crystal disposed between the electrode plates;

wherein one of the electrode plates comprises a substrate, a plurality of transparent conductor stripes disposed on the substrate, a plurality of elongated metal films each disposed at least one side of and electrically connected with one of the conductor stripes so as to form a transparent region and an opaque region of a conductor stripe, and a second metal film for light-shielding disposed on the substrate so as to be electrically insulated from the conductor stripes with an insulating film disposed between the second metal film and the conductor stripes;

wherein the second metal film is separated into a plurality of discrete masking parts each in the form of a frame leaving an aperture; the plurality of discrete masking parts are disposed so that plural masking parts among them are disposed along one conductor stripe so as to form plural apertures along the transparent region of the conductor stripe, the masking parts disposed along one conductor stripe are separated from masking parts disposed along an adjacent conductor stripe by a separation which is covered by the first metal film, and a spacing between said one conductor stripe and said adjacent conductor stripe is covered by the masking parts disposed along said adjacent conductor stripe; and a color filter comprising a plurality of segments is disposed to cover the plurality of masking parts so that each segment corresponds to one of the apertures.

12. A liquid crystal device according to claim 11, wherein said liquid crystal is a ferroelectric liquid crystal.

* * * * *

UNITED STATES PATENT AND TRADEMARK OFFICE
CERTIFICATE OF CORRECTION

PATENT NO. : 5,282,070
DATED : January 25, 1994
INVENTOR(S) : NAOYA NISHIDA, ET AL.

Page 1 of 2

It is certified that error appears in the above-indentified patent and that said Letters Patent is hereby corrected as shown below:

ON TITLE PAGE

In [54] Title: "APERATURE" should read --APERTURE--.

In [56] References Cited, under U.S. PATENT DOCUMENTS:
"Fukuyashi" should read --Fukuyoshi--;
insert: --5,519,478  10/1992  Akiyama et al.
         4,853,296   8/1989  Fukuyoshi--.

COLUMN 1

Line 2, "APERATURE" should read --APERTURE--.

COLUMN 2

Line 67, "the" (first occurrence) should read --to--.

COLUMN 3

Line 20, "form" should read --form of--.
Line 32, "part" should read --parts--.
Line 34, "there is liable to be encoun-" should be deleted.
Line 35, "tered with a difficulty that" should be deleted and "are" should read --are liable to--.
Line 36, "circuited" should read --circuit--.
Line 53, "single" should read --signal--.

COLUMN 4

Line 52, "line B-B," should read --line B-B',--.

UNITED STATES PATENT AND TRADEMARK OFFICE
CERTIFICATE OF CORRECTION

PATENT NO. : 5,282,070
DATED      : January 25, 1994
INVENTOR(S): NAOYA NISHIDA, ET AL.

Page 2 of 2

It is certified that error appears in the above-indentified patent and that said Letters Patent is hereby corrected as shown below:

COLUMN 5

Line 47, "plats" should read --plates--.
Line 65, "pars 4" should read --parts 4--.

Signed and Sealed this

Thirteenth Day of September, 1994

Attest:

BRUCE LEHMAN

*Attesting Officer*   *Commissioner of Patents and Trademarks*